(12) United States Patent
Kobayashi

(10) Patent No.: US 10,252,616 B2
(45) Date of Patent: Apr. 9, 2019

(54) DISPLAY DEVICE

(71) Applicant: YAZAKI CORPORATION, Tokyo (JP)

(72) Inventor: Ryo Kobayashi, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/969,052

(22) Filed: Dec. 15, 2015

(65) Prior Publication Data

US 2016/0096432 A1    Apr. 7, 2016

Related U.S. Application Data

(63) Continuation of application No. PCT/JP2014/065748, filed on Jun. 13, 2014.

(30) Foreign Application Priority Data

Jun. 20, 2013  (JP) ................. 2013-129913

(51) Int. Cl.
| | |
|---|---|
| *G01D 7/02* | (2006.01) |
| *B60K 35/00* | (2006.01) |
| *B60K 37/02* | (2006.01) |
| *G09G 5/02* | (2006.01) |
| *G09G 3/20* | (2006.01) |
| *G09G 3/36* | (2006.01) |

(52) U.S. Cl.
CPC ............. *B60K 35/00* (2013.01); *B60K 37/02* (2013.01); *G01D 7/02* (2013.01); *G09G 3/2096* (2013.01); *G09G 3/3648* (2013.01); *G09G 5/02* (2013.01); *B60K 2350/1072* (2013.01); *B60K 2350/2017* (2013.01); *B60K 2350/2065* (2013.01); *B60K 2350/408* (2013.01); *G09G 2360/18* (2013.01); *G09G 2380/10* (2013.01)

(58) Field of Classification Search
CPC combination set(s) only.
See application file for complete search history.

(56) References Cited

U.S. PATENT DOCUMENTS

2007/0285388 A1* 12/2007 Ogasawara ............ B60K 35/00
345/157

FOREIGN PATENT DOCUMENTS

| EP | 2 072 318 A1 | 6/2009 |
|---|---|---|
| JP | 2000-221915 A | 8/2000 |
| JP | 2003-137007 A | 5/2003 |

(Continued)

OTHER PUBLICATIONS

German to English Machine Language Translation of EP2072318 (see Office Action for disclosure of relenvantly cited portions).*

(Continued)

*Primary Examiner* — Nabil H Syed
*Assistant Examiner* — Cal J Eustaquio
(74) *Attorney, Agent, or Firm* — Sughrue Mion, PLLC

(57) ABSTRACT

A display device includes a display section that displays a pointer rotating around a rotation center provided in an end side and pointing to a part on a speed scale with the other end and a shadow portion displayed next to the pointer and having display density smaller than that of the pointer. A rotation center of the shadow portion is separated from the rotation center of the pointer by a certain distance. This configuration provides a display device that can implement a novel display feature.

7 Claims, 6 Drawing Sheets

(56) References Cited

FOREIGN PATENT DOCUMENTS

| | | |
|---|---|---|
| JP | 2007-30531 A | 2/2007 |
| JP | 2007-206427 A | 8/2007 |
| JP | 2010-58633 A | 3/2010 |
| JP | 2011-121544 A | 6/2011 |

OTHER PUBLICATIONS

Japanese to English Machine Language Translation of JP 2003-137007 (see Office Action for disclosure of relevantly cited portions).*
International Search Report of PCT/JP2014/065748, dated Jul. 15, 2014. [PCT/ISA/210].
Written Opinion of PCT/JP2014/065748, dated Jul. 15, 2014. [PCT/ISA/237].
Communication dated Aug. 23, 2016 from the Japanese Patent Office issued in corresponding Application No. 2013-129913.

* cited by examiner

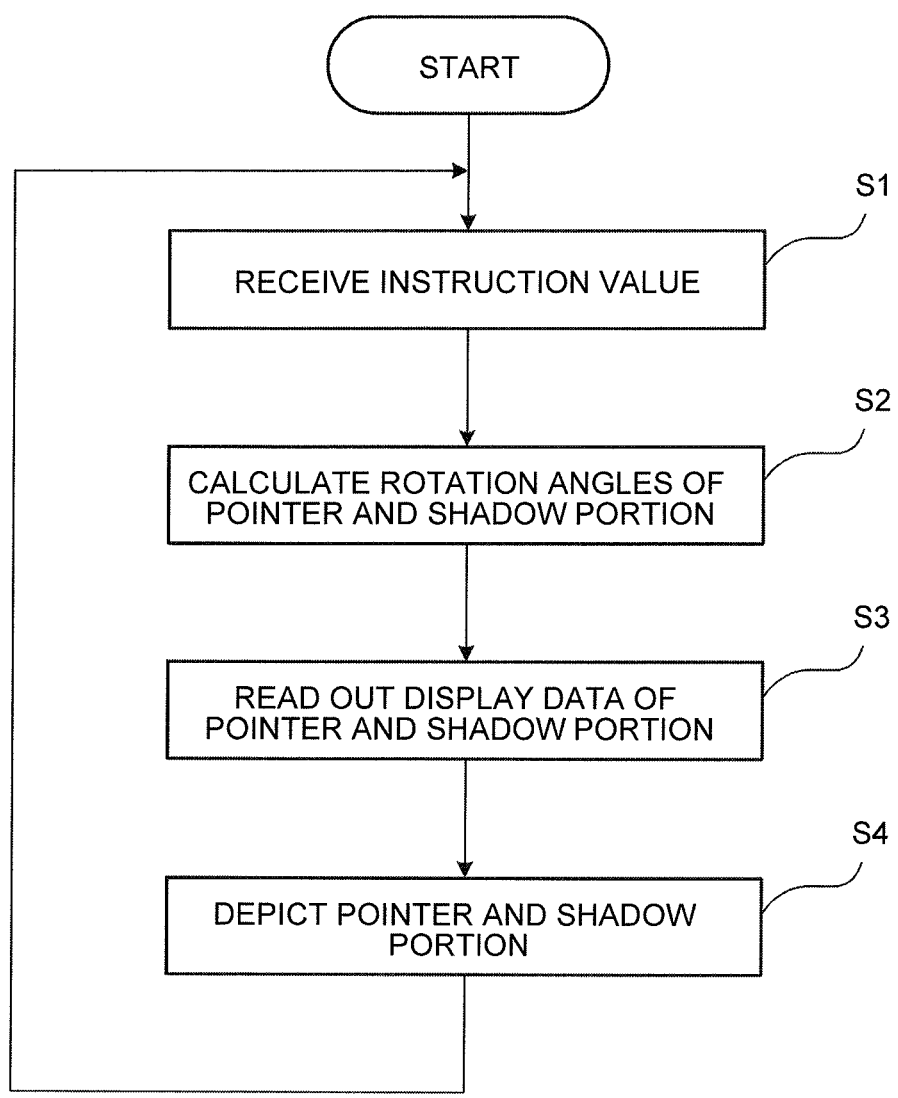

DISPLAY DEVICE

CROSS-REFERENCE TO RELATED APPLICATION

This application is a continuation application of International Application PCT/JP2014/065748, filed on Jun. 13, 2014, and designating the U.S., the entire contents of which are incorporated herein by reference.

BACKGROUND OF THE INVENTION

1. Field of the Invention

The present invention relates to a display device that can be used for a meter unit for a vehicle that displays measuring instruments such as a speedometer and a fuel gauge. In particular, the present invention relates to a display device that can provide graphics display.

2. Description of the Related Art

In recent years, graphical meters with an image display system have been known. In the system, a display device such as a liquid crystal display is used for displaying vehicle meters on a screen (refer to Japanese Patent Application Laid-open No. 2000-221915, for example). Also in such a graphical meter, to achieve similar display to conventional measuring instruments with pointers, a scale and a pointer are typically displayed and the tip of the pointer indicates a portion on the scale, thereby indicating given numeric value information.

Japanese Patent Application Laid-open No. 2003-137007 describes a graphic meter that displays a shadow area extending in the backward direction (counterclockwise) in the direction in which the pointer moves. Japanese Patent Application Laid-open No. 2003-137007 uses the shadow area for adding an image of a radar to the pointer.

Implementing various novel display features have been required for more desirable display devices.

SUMMARY OF THE INVENTION

The present invention has been made in view of the above-described situation. And an object of the present invention is to provide a display device that implements a novel display feature.

In order to solve the above mentioned problem and achieve the object, a display device according to one aspect of the present invention includes a display section configured to display a pointer in a shape of a stick which rotates around a rotation center provided in an end side and points to a part on a scale with an another end, and a shadow portion which rotates around the rotation center provided in the end side and has display density smaller than display density of the pointer. Here, the rotation center of the shadow portion is separated from the rotation center of the pointer by a certain distance.

Further, In order to solve the above mentioned problem and achieve the object, a display device according to another aspect of the present invention includes a display section configured to display a pointer in a shape of a stick which rotates around a rotation center provided in an end side and points to a part on a scale with an another end, and a shadow portion which is displayed next to the pointer and has display density smaller than display density of the pointer. Here, the display section displays the shadow portion in a position closer to a first direction side than the pointer, when the another end is positioned in the first direction side with respect to a reference line passing through the rotation center of the pointer and extending in a certain lighting direction, in a rotation direction of the pointer. The display section displays the shadow portion in a position closer to a second direction side than the pointer, when the another end is positioned in the second direction side which is a side opposite to the first direction side with respect to the reference line, in the rotation direction of the pointer.

A novel display feature can be implemented by having a pointer displayed as if the pointer is lighted from a certain direction.

As described in Japanese Patent Application Laid-open No. 2003-137007, a shadow of a pointer can be expressed by displaying the pointer using a pointer image with a shadow area added in the backward direction; however, this method cannot change the position of the shadow when the pointer image is rotated, which makes the image look unnatural.

By using the display device according to one aspect of the present invention, the pointer is recognized as if lighted from a lighting direction, which is a direction from the rotation center of the pointer toward the rotation center of the shadow portion. A natural looking shadow can be accordingly added to the rotating pointer. This manner can develop a novel display feature and therefore provide a more desirable display device.

With the display device according to another aspect of the present invention, the display direction of the shadow portion corresponding to the pointer can be changed depending on whether the pointer is positioned in the first direction side or in the second direction side with respect to the reference line. This manner enables the pointer to be recognized as if the pointer is lighted from the lighting direction and accordingly add a natural looking shadow to the rotating pointer regardless of the display position of the pointer, which can consequently implement a novel display feature and provide a more desirable display device.

The present invention has been briefly described. The detail of the present invention will be understood more clearly by reading through the description of an embodiment (hereinafter referred to as the "embodiment") below with reference to the accompanying drawings.

BRIEF DESCRIPTION OF THE DRAWINGS

FIG. 4 is a flowchart that illustrates a procedure of the display operation of the pointer;

DETAILED DESCRIPTION OF THE PREFERRED EMBODIMENTS

The following describes a display device according to the present embodiment with reference to the accompanying drawings. The display device according to the present embodiment is applied to a graphical meter installed in an instrument panel inside a vehicle.

Figure 1:
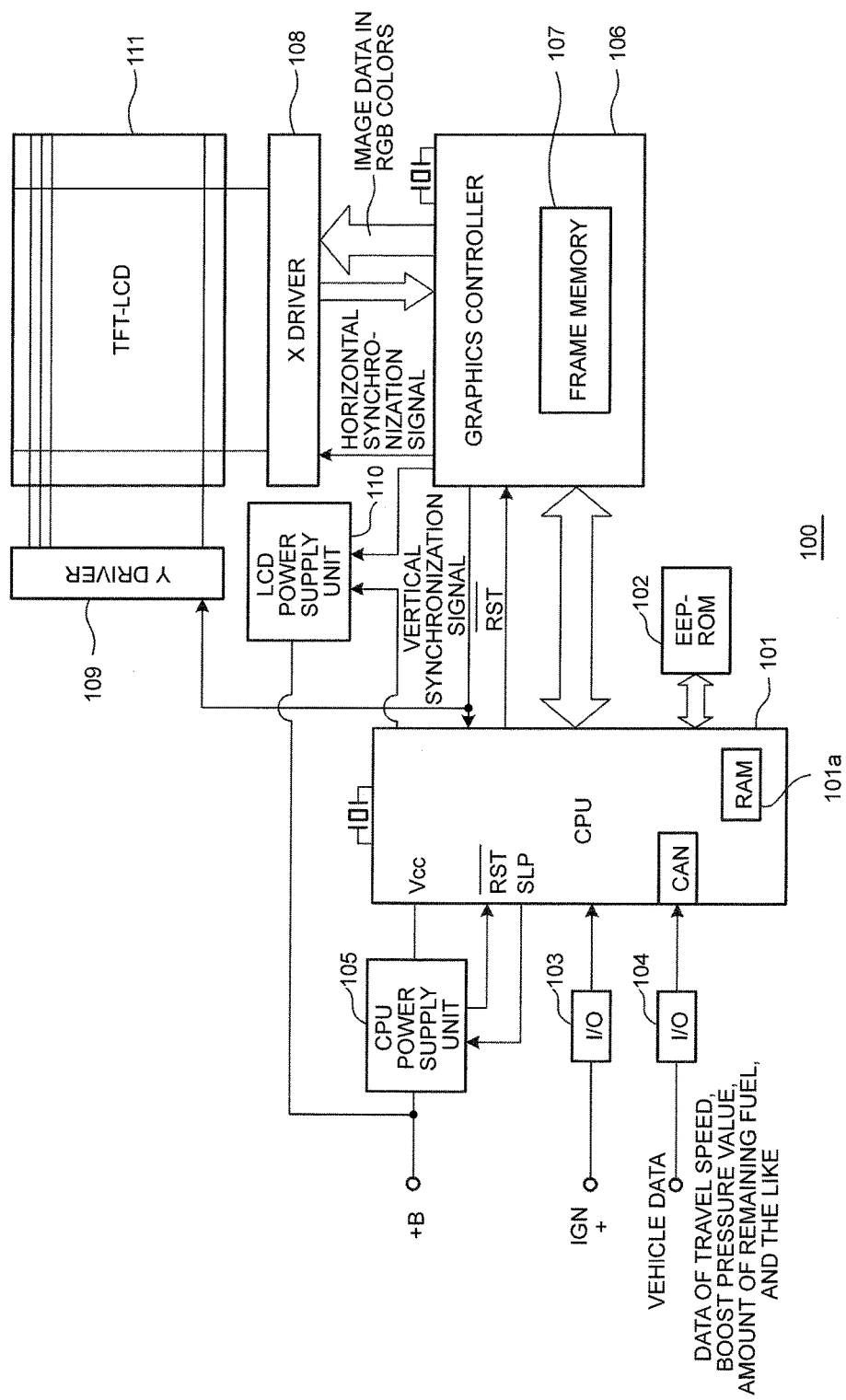
FIG. 1 is a block diagram that illustrates an exemplary configuration of hardware of a display device according to an embodiment.

FIG. 1 is a block diagram illustrating an example of the hardware configuration of a display device 100 that is a display device according to the present embodiment. As illustrated in FIG. 1, the display device 100 includes a controller (a microcomputer, a central processing unit (CPU)) 101, a read-only memory (an electrically erasable programmable read-only memory (EEPROM)) 102, an interface 103, an interface 104, a CPU power supply unit 105, a graphics controller 106, a frame memory 107, an X driver 108, a Y driver 109, a liquid crystal display (LCD) power supply unit 110, a display section (a liquid crystal display, a thin film transistor liquid crystal display (TFT-LCD)) 111, and other components.

The controller 101 executes a previously prepared computer program and various types of processing needed to implement the functions of the display device 100. For example, the controller 101 executes drawing processing of a later-described pointer as illustrated in FIG. 3. The controller 101 includes a random access memory (RAM) 101a for transitorily storing therein various types of data. The RAM 101a stores therein various types of data.

The read-only memory 102 stores various kinds of fixed data such as the content of a computer program executed by the controller 101 and display data for depicting later-described pointer 36 and shadow portion 34.

The interface 103 inputs a signal (IGN+) indicating the state of an ignition switch on the vehicle side to the controller 101.

The interface 104 is utilized for communications based on the controller area network (CAN) protocol between the controller 101 and various types of control devices (electric controllers (ECUs)) on the vehicle side. Specifically, the data representing the current values of various types of quantity of states of a vehicle, such as a running speed, a supercharger pressure value, and the remaining amount of fuel, is input from the vehicle side through the interface 104 to the controller 101 as substantially real-time data.

For example, the interface 104 receives a vehicle speed pulse signal output from a speed sensor mounted on the vehicle side every time the vehicle moves for a given amount of distance. The interface 104 then outputs the received signal to the controller 101 as running speed information representing the value of the current vehicle running speed.

The interface 104 receives information of the fuel amount detected by a fuel gauge and outputs the information to the controller 101.

The interface 104 also receives a signal representing the current value of the supercharger pressure value output from a pressure sensor detecting the pressure of compressed air forcibly supplied to an internal combustion engine by a supercharger. The interface 104 then outputs the received signal to the controller 101 as supercharger pressure information representing the current supercharger pressure value.

The CPU power supply unit 105 inputs a direct-current power supplied from a positive power supply line (+B) on the vehicle side and generates a direct-current voltage (Vcc) necessary for the operation of the controller 101. The CPU power supply unit 105 generates a reset signal (RST) and performs an operation for reducing power supply according to a sleep signal (SLP) output from the controller 101, as necessary.

The display section 111 is configured with a liquid crystal display such as a thin film transistor liquid crystal display (TFT-LCD) and has a two-dimensional color display screen where a plurality of minor display cells each configured with a liquid crystal device are aligned in the X direction and in the Y direction. The display section 111 is an image display that controls the display status of each minor display cell and graphically displays desired information such as a graphic, a letter, and an image on the two-dimensional display screen. In the embodiment, the display content displayed by the display section 111 is depicted by the vector graphics expressing an image using calculation based on numeric data such as dot coordinates and a line (a vector) connecting between the coordinates.

Figure 2:
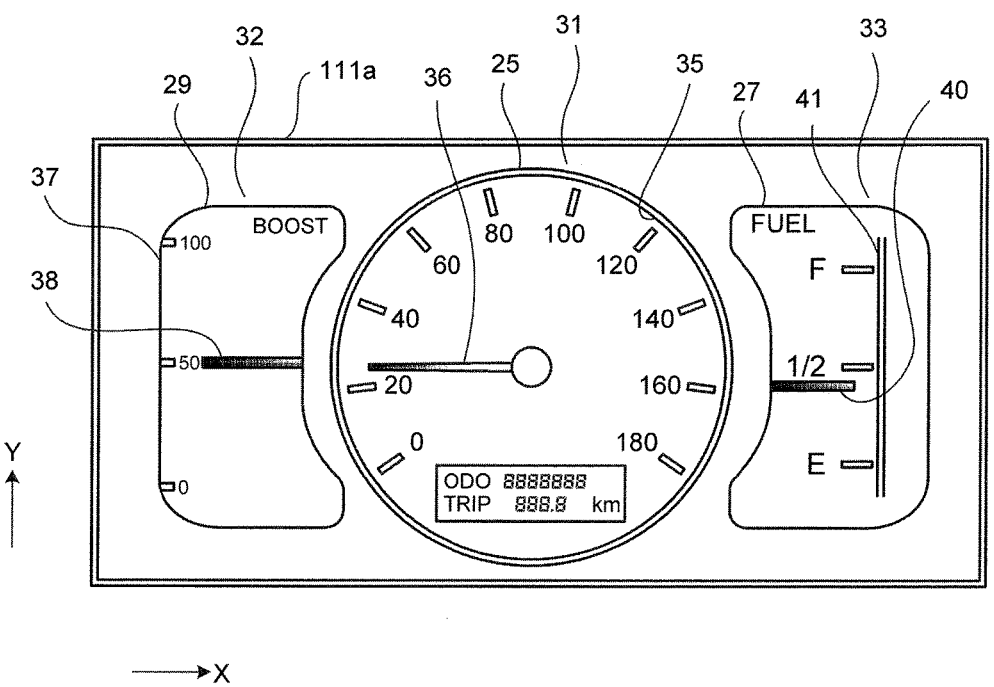
FIG. 2 is a drawing that illustrates a graphic display screen of a display section.

FIG. 2 is a drawing that illustrates a graphic display screen 111a of the display section 111. The graphic display screen 111a has a first display area 31, a second display area 32, and a third display area 33, which display areas different from one another. The lateral direction in FIG. 2 indicates the X direction and the vertical direction in FIG. 2 indicates the Y direction.

The first display area 31 is an area for displaying the travel speed of a current vehicle. A display area 31 displays thereon a speed scale 35 and the pointer 36 configuring a speed meter 25. The pointer 36 is displayed in the shape of a stick. The pointer 36 rotates around a rotation center 51 (see FIG. 3B) provided in an end side and points to a part on the speed scale 35 with a leading end provided in the other end side, thereby indicating the travel speed of the current vehicle.

The second display area 32 is an area for displaying a presented value (a gauge value) of the current supercharger pressure value. In the second display area 32, a pressure measurement scale 37 and a pointer 38 are displayed as a boost gauge 29. The supercharger pressure value is presented as numeric value information, specifically, as the ratio (percentage) relative to the predetermined maximum value, as represented in Expression (1):

$$\text{Scale [\%]} = \frac{\text{Measured value [kgf/cm}^2\text{]}}{\text{Boost pressure maximum value [kgf/cm}^2\text{]}} \quad (1)$$

The pressure measurement scale 37 is provided in the left end of the second display area 32 as a part of the case of the boost gauge 29. The pressure measurement scale 37 has scale marks for indicating the percentage by values 0, 50, and 100. The pointer 38 is displayed in the form of a stick. The pointer 38 is provided in the right side of the pressure measurement scale 37 and moves upward and downward along the pressure measurement scale 37.

The third display area 33 is an area for displaying the current amount of remaining fuel. The third display area 33 displays thereon a fuel scale 41 and a pointer 40 configuring a fuel gauge 27. The pointer 40 is displayed in the form of a stick. The pointer 40 points to a part on the fuel scale 41 and indicates the current amount of remaining fuel.

Referring back to FIG. 1, the scanning position in the Y direction on the graphic display screen 111a of the display section 111 is sequentially switched by an output from the Y driver 109. The Y driver 109 sequentially switches the scanning position in the Y direction in synchronization with a vertical synchronization signal output from the graphics controller 106.

The X driver 108 sequentially switches the scanning position on the display screen of the display section 111 in the X direction, in synchronization with a horizontal synchronizing signal output from the graphics controller 106. The X driver 108 controls the display contents on the screen by providing image data of RGB colors output from the graphics controller 106 to the display cells at the scanning position.

The graphics controller 106 displays various graphic elements on the graphic display screen 111a of the display section 111 in response to various commands input by the controller 101. Specifically, the controller 101 or the graphics controller 106 writes display data to the frame memory 107 storing the display content of each pixel and depicts graphics. The graphics controller 106 generates a vertical synchronization signal and a horizontal synchronization signal for performing two-dimensional scanning on the graphic display screen 111a of the display section 111 and provides display data stored in a corresponding address on the frame memory 107 to the display section 111 at a timing synchronous with the synchronization signals.

The LCD power supply unit 110 inputs direct-current power supplied from the positive power supply line (+B) on the vehicle side and generates given direct-current power necessary for display on the display section 111.

Figure 3A:
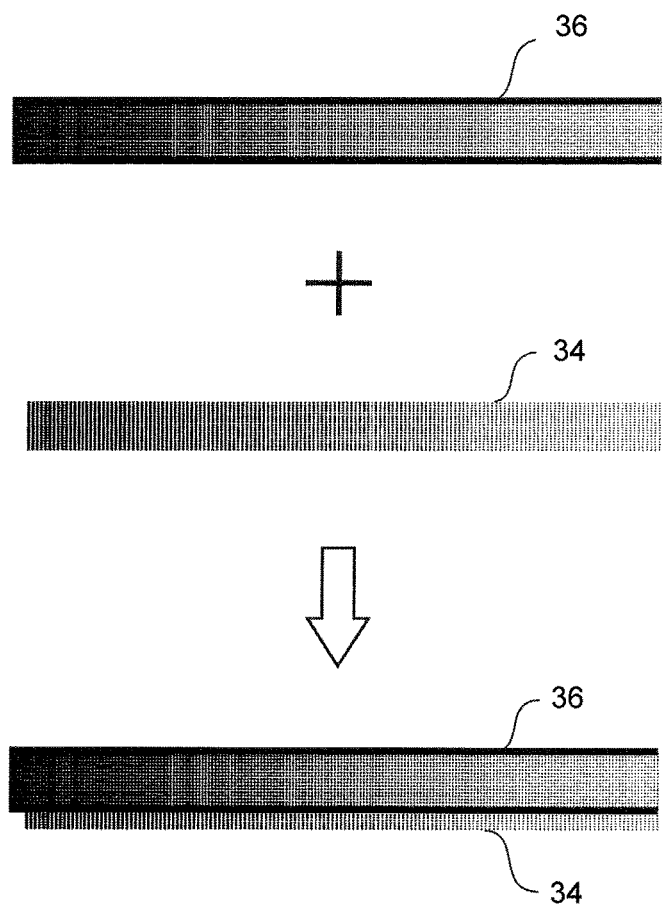
FIG. 3A are drawings that illustrate display features of a pointer and a shadow portion and are schematic drawings that illustrate a combination of: a drawing of the pointer, a drawing of the shadow portion, and a drawing of the state where the pointer and the shadow portion disposed with each other.
Figure 3B:
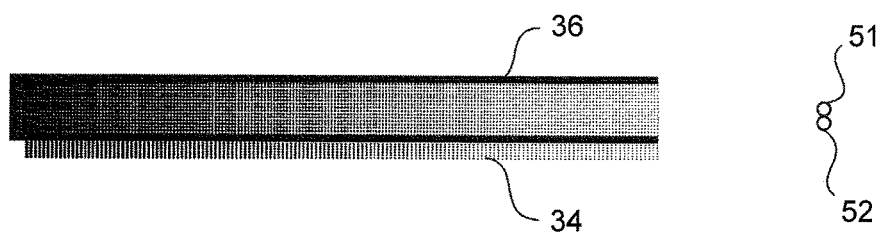
FIG. 3B is a drawing that illustrates a display feature of the pointer and the shadow portion and illustrates respective rotation centers of the pointer and the shadow portion.

The display feature of the pointer 36 of the speed meter 25 will now be described. FIGS. 3A and 3B are drawings that illustrate display features of the pointer 36 and the shadow portion 34. The upper and the middle drawings of FIG. 3A illustrate the pointer 36 and the shadow portion 34, respectively, and the lower drawing of FIG. 3A illustrates the state where the pointer 36 and the shadow portion 34 disposed with each other. FIG. 3B is a drawing that illustrates respective rotation centers of the pointer 36 and the shadow portion 34. The pointer 36 is depicted by the vector graphics expressing an image using calculation based on numeric data such as dot coordinates and a line (a vector) connecting between the coordinates.

In the embodiment, as FIG. 3A illustrates, display elements are used for displaying the pointer 36 and the shadow portion 34. Gradations (a sequential change in color density) are added to each of the display elements of the pointer 36 and the shadow portion 34 in the longitudinal direction. The density of the shadow portion 34 is smaller than that of the pointer 36. Display data of the pointer 36 and the shadow portion 34 are preliminarily stored in the read-only memory 102.

With these display elements, the pointer 36 is depicted as a shadowed pointer with the shadow portion 34 added thereto by causing the pointer 36 and the shadow portion 34 to disposed with each other as FIG. 3A illustrates. In this case, the shadow portion 34 is displayed next to the pointer 36.

In rotating the pointer 36, respective rotation centers of the pointer 36 and the shadow portion 34 are disposed in positions different from each other. In other words, as FIG. 3B illustrates, the rotation center 51 of the pointer 36 is disposed in a manner separated from a rotation center 52 of the shadow portion 34 in the lighting direction, which is in the upward direction (+Y direction), by a small distance (for example, by a few pixels). In the similar manner with the pointer 36, the shadow portion 34 is rotated around the rotation center 52 provided in an end side.

The display operation of the pointer 36 of the speed meter 25 in the display device 100 configured as above will now be described. FIG. 4 is a flowchart that illustrates a procedure of the display operation of the pointer 36 of the speed meter 25. The controller 101 receives an instruction value, which is a current travel speed of the vehicle, through the interface 104 (Step S1). The controller 101 calculates the respective rotation angles of the pointer 36 and the shadow portion 34 corresponding to the received instruction value (Step S2).

The controller 101 reads out display data of the pointer 36 and the shadow portion 34 stored in the read-only memory 102 (Step S3) and performs processing for depicting each display element (Step S4). In other words, the controller 101 displays the pointer 36 around the rotation center 51 in a position corresponding to the rotation angle calculated at the Step S2. Furthermore, the controller 101 displays the shadow portion 34 around the rotation center 52 in a position corresponding to the rotation angle calculated at the Step S2. With this process, as FIG. 2 illustrates, the pointer 36, which is a shadowed pointer, indicates the speed on the speed meter 25. The controller 101 returns the processing to the Step S1.

Figure 5:
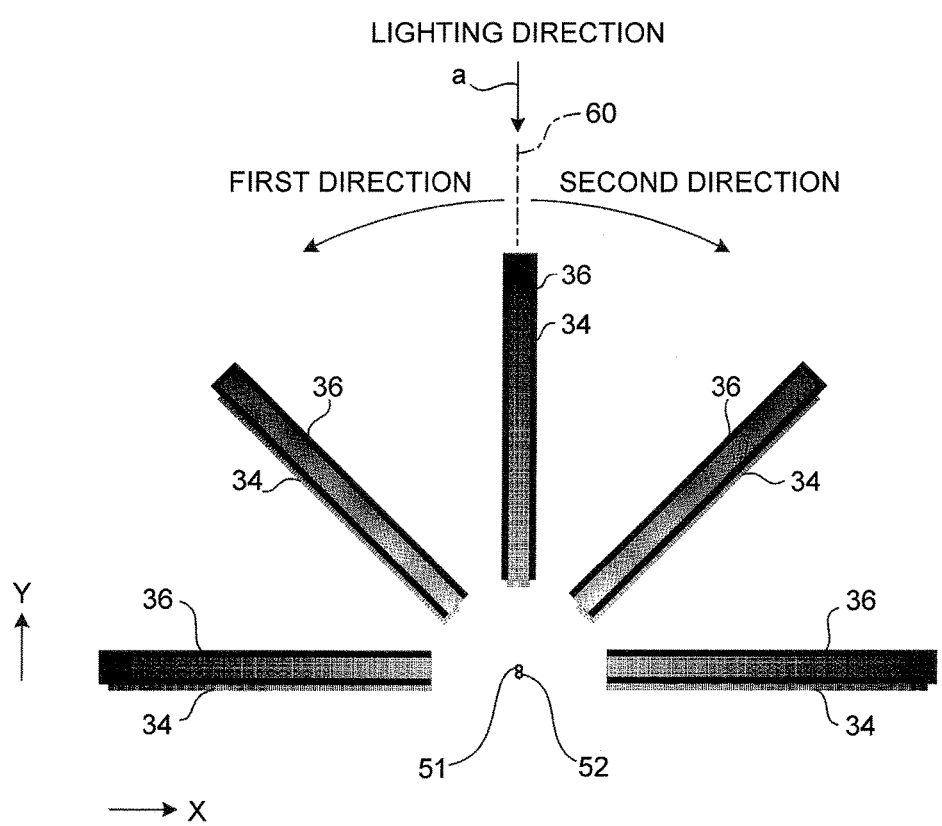
FIG. 5 is a drawing that illustrates a state where the pointer and the shadow portion disposed with each other when the pointer and the shadow portion are rotated around respective rotation centers.

FIG. 5 is a drawing that illustrates a state where the pointer 36 and the shadow portion 34 are disposed with each other when the pointer 36 and the shadow portion 34 are rotated around the rotation centers 51 and 52, respectively. When the pointer 36 is positioned in the left side indicating the lower speed side, the shadow portion 34 is positioned in the lower side (−Y direction side) of the pointer 36. When the pointer 36 is in a directly upward position indicating a speed of approximately 90 km/h, the shadow portion 34 and the pointer 36 coincide with each other in the Y direction. At this moment, the shadow portion 34 is positioned in the slightly lower side of the pointer 36 in the X direction. When the pointer 36 is positioned in the right side indicating the higher speed side, the shadow portion 34 is positioned in the lower side (−Y direction side) of the pointer 36.

With the display device 100 according to the embodiment, the pointer 36 is recognized as if the pointer 36 is lighted from the lighting direction (+Y direction), which is a direction from the rotation center 51 toward the rotation center 52, regardless of the display position of the pointer 36. This configuration can add a natural looking shadow to the rotating pointer 36. Furthermore, gradations are added to the pointer 36 and the shadow portion 34, which enables wide variations in expression.

From another viewpoint, as FIG. 5 illustrates, when the other end (the leading end pointing to the speed scale 35) of the pointer 36 is positioned, in the rotation direction of the pointer 36, in a first direction side (counterclockwise, that is, the lower speed side) with respect to a reference line 60 (a straight line passing through the rotation center 51 and parallel to the Y direction) passing through the rotation center 51 of the pointer 36 and extending in a certain lighting direction a, the display device 100 according to the embodiment displays the shadow portion 34 in a position closer to the first direction side than the pointer 36. Conversely, when the other end of the pointer 36 is positioned in a second direction side (the clockwise direction, that is, the higher speed side), which is a side opposite to the first direction side, with respect to the reference line 60, the display device 100 according to the embodiment displays the shadow portion 34 in a position closer to the second direction side than the pointer 36. In this case, the display direction of the shadow portion 34 corresponding to the pointer 36 is changed based on whether the pointer 36 is positioned in the first direction side or in the second direction side with respect to the reference line 60. This configuration enables the pointer 36 to be recognized as if the pointer 36 is lighted from the lighting direction, thereby adding a natural looking shadow to the rotating pointer 36.

In the above-described embodiment, the pointer 36 is displayed as if the pointer 36 is lighted from the lighting direction a, which is the +Y direction (directly upward direction). However, the embodiment is not limited to the lighting direction, and any lighting direction such as an obliquely left upward direction, a directly upward direction, and an obliquely right upward direction is applicable. A modification of the display features of the pointer and the shadow portion will be described with reference to FIG. 6.

Figure 6:
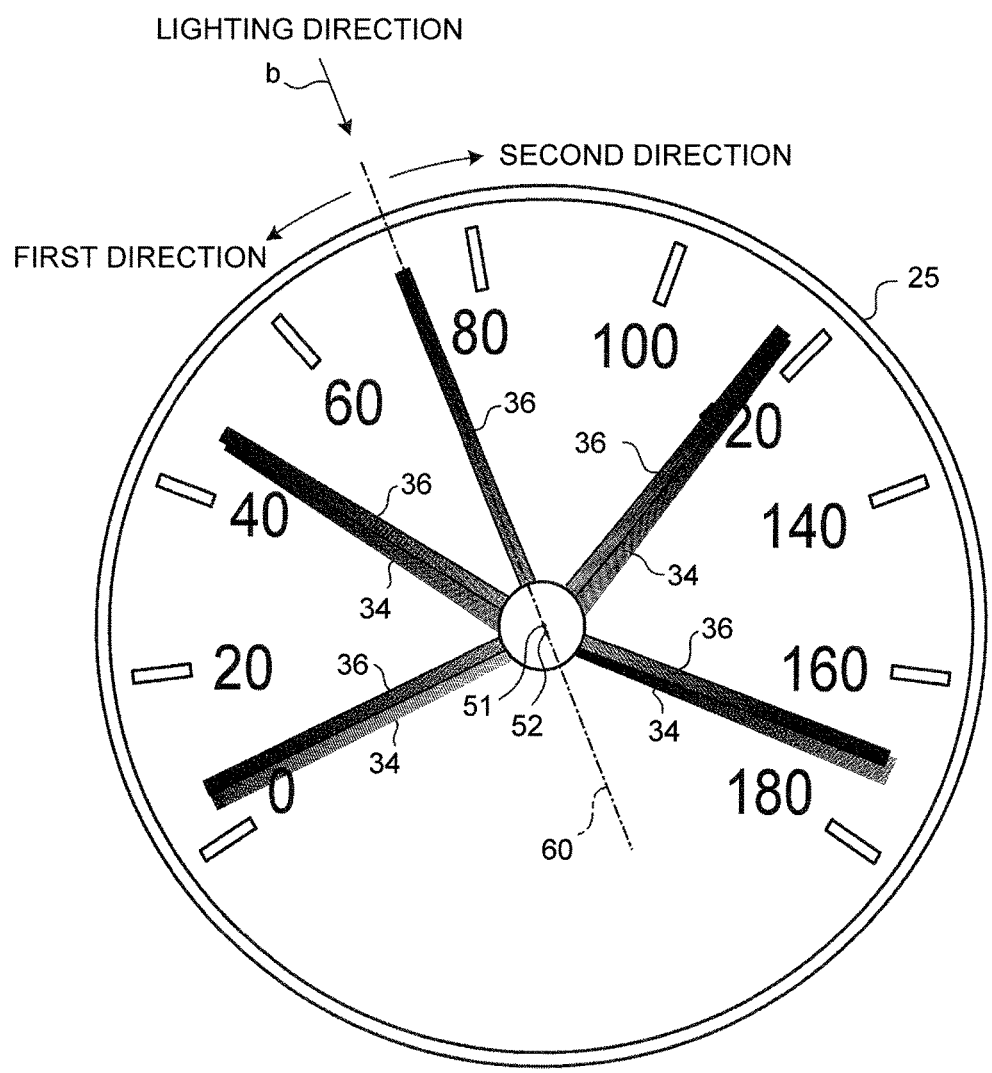
FIG. 6 is a drawing that illustrates a modification of the display feature of the pointer and the shadow portion.

FIG. 6 is a drawing that illustrates a modification of the display features of the pointer and the shadow portion. In the example illustrated in FIG. 6, a lighting direction b of a virtual light is disposed in the obliquely left upward direction. In the modification, as FIG. 6 illustrates, when the other end (the leading end pointing to the speed scale 35) of the pointer 36 is positioned, in the rotation direction of the pointer 36, in a first direction side (counterclockwise, that is, the lower speed side) with respect to the reference line 60 passing through the rotation center 51 of the pointer 36 and extending in the lighting direction b, the shadow portion 34 is displayed in a position closer to the first direction side than the pointer 36. Conversely, when the other end of the pointer 36 is positioned, in the rotation direction of the pointer 36, in a second direction side (the clockwise direction, that is, the higher speed side), which is a side opposite to the first direction side, with respect to the reference line 60, the shadow portion 34 is displayed in a position closer to the second direction side than the pointer 36.

In the example of FIG. 6, the rotation center 52 of the shadow portion 34 is separated from the rotation center 51 of the pointer 36 in the lighting direction b by a certain distance. In other words, in FIG. 6, the rotation center 52 of the shadow portion 34 is positioned in the obliquely right downward direction from the rotation center 51 of the pointer 36.

Furthermore, in the example of FIG. 6, the shadow portion 34 is in a shape corresponding to the rotation angle of the pointer 36. Specifically, based on the difference in angle between the pointer 36 and the lighting direction b, the shape of the shadow portion 34 is changed so as to form a more natural looking shadow. When the difference in angle is approximately 0 degree or +/−90 degrees, the shadow portion 34 is in a rectangular shape. When the difference in angle is approximately +/−45 degrees, the shadow portion 34 is in such a shape that is narrow in the leading end side and wide in the base end side of the pointer 36. When the difference in angle is approximately +/−135 degrees exceeding +/−90 degrees, the shadow portion 34 is conversely in such a shape that is wide in the leading end side and narrow in the base end side of the pointer 36. In this manner, the shape of the shadow portion 34 varies depending on the difference in angle between the pointer 36 and the lighting direction b, thereby expressing a more natural looking shadow.

The display device 100 according to the embodiment will be summarized.

1. The display device 100 according to the embodiment includes the display section 111 that displays the pointer 36 rotating around the rotation center 51 provided in an end side and pointing to a part on the speed scale 35 with the other end, and the shadow portion 34 displayed next to the pointer 36 and having display density smaller than that of the pointer 36. The rotation center 52 of the shadow portion 34 is separated from the rotation center 51 of the pointer 36 by a certain distance.

2. The display device 100 according to the embodiment includes the display section 111 that displays the pointer 36 rotating around the rotation center 51 provided in an end side and pointing to a part on the speed scale 35 with the other end, and the shadow portion 34 displayed next to the pointer 36 and having display density smaller than that of the pointer 36. The display section 111 displays the shadow portion 34 in a position closer to a first direction side than the pointer 36 when the other end is positioned, in the rotation direction of the pointer 36, in the first direction side with respect to a reference line passing through the rotation center 51 of the pointer 36 and extending in a certain lighting direction a or b. Conversely, the display section 111 displays the shadow portion 34 in a position closer to a second direction side than the pointer 36 when the other end is positioned, in the rotation direction of the pointer 36, in the second direction side, which is a side opposite to the first direction side, with respect to the reference line.

Gradations are added to each of the pointer 36 and the shadow portion 34. In each of the pointer 36 and the shadow portion 34, the density varies in the longitudinal direction, which enables wide variations in expression.

As FIG. 6 illustrates, the shadow portion 34 may be in a shape different from the pointer 36. This manner enables the shape of the shadow portion 34 to look more like the shadow of the pointer 36. Specifically, by forming the shape of the shadow portion 34 in a manner corresponding to the rotation angle of the pointer 36 with respect to the lighting direction b, the shape of the shadow portion 34 varies according to the rotation angle of the pointer 36, thereby expressing a more natural looking shadow.

According to the present invention, such a display device is provided that can implement a novel display feature.

The scope of the technology in the present invention is not limited to the above-described embodiment. The embodiment can be modified and improved in various ways within the scope of the technology in the invention.

In the above-described embodiment, as an exemplary case, the pointer of a speed gauge has been displayed as a rotating pointer. However, the embodiment may also be applicable to other rotating pointers such as pointers of a tachometer and a fuel gauge.

What is claimed is:

1. A display device comprising:
a display section configured to display a pointer in a shape of a stick which rotates around a rotation center provided in an end side and points to a part on a scale with an other end, and a shadow portion which rotates around the rotation center provided in the end side and has display density smaller than display density of the pointer, wherein
the rotation center of the shadow portion is separated from the rotation center of the pointer by a certain distance,
the shadow portion is not displayed from the rotation center of the shadow portion by a predetermined distance, and
a width of the shadow portion is formed narrowly from a leading end side of the pointer to a base end side of the pointer or widely from the leading end side of the pointer to the base end side of the pointer based on a difference in angle between the pointer and a certain lighting direction.

2. A display device comprising:
a display section configured to display a pointer in a shape of a stick which rotates around a rotation center provided in an end side and points to a part on a scale with an other end, and a shadow portion which is displayed next to the pointer and has display density smaller than display density of the pointer, wherein the display section displays the shadow portion in a position closer to a first direction side than the pointer, when the another end is positioned in the first direction side with respect to a reference line passing through the rotation center of the pointer and extending in a certain lighting direction, in a rotation direction of the pointer, the display section displays the shadow portion in a position closer to a second direction side than the pointer, when the another end is positioned in the second direction side which is a side opposite to the first direction side with respect to the reference line, in the rotation direction of the pointer, the shadow portion is not displayed from a rotation center of the shadow portion by a predetermined distance, and a width of the shadow portion is formed narrowly from a leading end side of the pointer to a base end side of the pointer or widely from the leading end side of the pointer to the base end side of the pointer based on a difference in angle between the pointer and a certain lighting direction.

3. The display device according to claim 1, wherein the shadow portion is formed in a shape of a stick and displayed so as to increase the display density with distance in the longitudinal direction of the shadow portion from the end side.

4. The display device according to claim 1, wherein the shadow portion is displayed only to the pointer.

5. The display device according to claim 1, wherein the pointer is not displayed from the rotation center of the pointer by a predetermined distance.

6. The display device according to claim 2, wherein the shadow portion is formed in a shape of a stick and displayed so as to increase the display density with distance in the longitudinal direction of the shadow portion from a point adjacent to the end side of the pointer.

7. The display device according to claim 1, wherein the shadow portion is in a rectangular shape when the difference in angle is approximately 0 degrees or +/−90 degrees, the shadow portion is in such a shape that is narrow in the leading end side of the pointer and wide in the base end side of the pointer when the difference in angle is approximately +/−45 degrees, and the shadow portion is in such a shape that is wide in the leading end side of the pointer and narrow in the base end side of the pointer when the difference in angle is approximately +/−135 degrees exceeding +/−90 degrees.

* * * * *